Nov. 12, 1968 A. L. GOOD 3,410,969
SWITCHING DEVICE HAVING A LATCHABLE ACTUATING LEVER
Filed April 13, 1965 8 Sheets-Sheet 1

INVENTOR.
ARTHUR L. GOOD

BY

*Cauda & Cauda*

HIS ATTORNEYS

Nov. 12, 1968   A. L. GOOD   3,410,969
SWITCHING DEVICE HAVING A LATCHABLE ACTUATING LEVER
Filed April 13, 1965   8 Sheets-Sheet 2

INVENTOR.
ARTHUR L. GOOD
BY
Cauder & Cauder
HIS ATTORNEYS

INVENTOR.
ARTHUR L. GOOD

BY

Candor & Candor

HIS ATTORNEYS

Nov. 12, 1968 A. L. GOOD 3,410,969
SWITCHING DEVICE HAVING A LATCHABLE ACTUATING LEVER
Filed April 13, 1965 8 Sheets-Sheet 4

INVENTOR.
ARTHUR L. GOOD
BY
Candor & Candor
HIS ATTORNEYS

Nov. 12, 1968  A. L. GOOD  3,410,969
SWITCHING DEVICE HAVING A LATCHABLE ACTUATING LEVER
Filed April 13, 1965  8 Sheets-Sheet 5

INVENTOR.
ARTHUR L. GOOD

BY

*Cauda & Cauda*
HIS ATTORNEYS

INVENTOR.
ARTHUR L. GOOD

BY

*Cauder & Cauder*

HIS ATTORNEYS

United States Patent Office 3,410,969
Patented Nov. 12, 1968

3,410,969
SWITCHING DEVICE HAVING A LATCHABLE
ACTUATING LEVER
Arthur L. Good, Elkhart, Ind., assignor to Robertshaw
Controls Company, Richmond, Va., a corporation of
Delaware
Filed Apr. 13, 1965, Ser. No. 447,765
30 Claims. (Cl. 200—38)

ABSTRACT OF THE DISCLOSURE

This disclosure relates to an electrical switching device of the like that has the actuator thereof moved from one position thereof to another position thereof by an actuating lever, the actuating lever having one end pivotally mounted to a free end of another pivotally mounted lever and having its other end adapted to be latched in one position thereof to provide a pivot point for the actuating lever, when the free end of the other lever is moved by a released spring force, to move the actuator to another operation position thereof.

---

This invention relates to an improved electrical switching device as well as to improved parts for such a switching device, or the like.

In particular, this invention provides an improved timing device which will cause an electrical switching operation at a pre-selected time, the switching operation being terminated, either by the lapse of a selected time interval, or by a sensed condition or by one of the two which occurs first.

For example, the control device of this invention includes a switching mechanism with a selection of variables which can be actuated by a synchronous electric motor to establish time and under any one or a variation of conditions, return it to its preactuated condition, such as a control device for the defrosting of a heating absorbing evaporator in various commercial refrigeration fields, wherein the removal of ice and frost for most refrigeration equipment is necessary to remain efficient.

One version of this invention would be to provide a control device having some combination of a double pole-double throw to a single pole-single throw electrical switching action with singular or multiple initiations for a given time and a related number of infinitely variable time settings for the termination of the initiated action, or an established fixer lapsed time and packaged with or without a housing means.

Another version of this invention would be where the electrically timed terminating means is a safety means in the event of failure of condition sensing terminating means, such as temperature sensing means.

Another version would be as above, except the terminating means would be with pressure.

Another version would be the same as above, except the terminating means would be by a solenoid operated from a remotely controlled means.

Another version of this invention would be the same as above, except the terminating means would be a current-carrying solenoid, with a special type action.

Further, the control device of this invention is so constructed and arranged that the same is relatively free of the effects of distortion, has a higher electrical capacity than presently available, has versatility in meeting switching arrangements, has means whereby control variations may be relatively easy to incorporate, has more freedom of selection of control settings than presently found, reduces the effects of dust and dirt in the operating mechanism than presently found, is more compact than presently found, has improved field accessibility over presently available controls, lends itself to readily available assembly means, and has other features which will be apparent hereinafter.

Accordingly, it is an object of this invention to provide an improved control device having one or more of the novel features set forth above or hereinafter shown or described.

Another object of this invention is to provide improved parts for such a control device or the like.

Other objects, uses and advantages of this invention are apparent from a reading of this description which proceeds with reference to the accompanying drawings forming a part thereof and wherein:

FIGURE 17 is a view similar to FIGURE 15 and illustrates the parts in another operating position thereof.

While the various features of this invention are hereinafter described and illustrated as being particularly adaptable to control the defrosting operation of a refrigeration system or the like, it is to be understood that the various features of this invention can be utilized singly or in any combination thereof to provide other switching operations as desired.

Therefore, this invention is not to be limited to only the embodiments illustrated in the drawings, because the drawings are merely utilized to illustrate one of the wide variety of uses of this invention.

Figure 1:
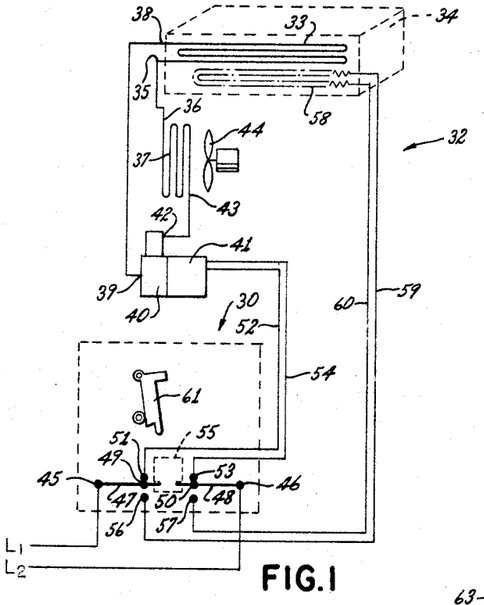
FIGURE 1 is a schematic view illustrating one application of the control device of this invention.

Referring now to FIGURE 1, the improved control device of this invention is generally indicated by the reference numeral 30 and comprises a housing means 31 indicated in dashed lines in FIGURE 1. The control device 30 of this invention is illustrated in FIGURE 1 as controlling the operation of a refrigerating system 32.

The refrigerating system 32 includes an evaporator 33 for cooling a chamber 34, the evaporator 33 having the inlet side 35 thereof interconnected to the outlet side 36 of a condenser 37 by suitable capillary restriction means or the like. The outlet side 38 of the evaporator 33 is interconnected to the inlet side 39 of a refrigerant compressor 40 driven by an electrical motor 41. The outlet side 42 of the compressor 40 is interconnected to the inlet side 43 of the condenser 37, the condenser 37 having the heat thereof dissipated in any suitable manner, such as by an air circulating means 44 or the like.

The control device 30 of this invention has two terminals 45 and 46 respectively interconnected to power leads $L^1$ and $L^2$ and to flexible switch blades 47 and 48 respectively carrying contacts 49 and 50.

The control device 30 has a fixed terminal or contact 51 interconnected to one side of the motor 41 by a lead 52 while another fixed terminal or contact 53 of the control device 30 is interconnected to the other side of the electric motor 41 by a lead 54.

The movable contacts 49 and 50 of the switch blades 47 and 48 are normally disposed in electrical contact with the contacts 51 and 53 by an actuator 55 to cause continuous operation of the compressor 40 to refrigerate the chamber 34.

The control device 30 carries another pair of fixed terminals or contacts 56 and 57, the contact 56 being interconnected to one side of an electrical heater 58 by a lead 59 while the contact 57 is interconnected to the other side of the electrical heater 58 by a lead 60.

Thus, with the system 32 disposed in the position illustrated in FIGURE 1, it can be seen that the electrical motor 41 is interconnected to the power leads $L^1$ and $L^2$ by the control device 30 of this invention so that the same continuously operates the compressor 40 to compress the refrigerant in the condenser 37 and evaporate the compressed refrigerant in the evaporator 33 so that the evaporator 33 cools the chamber 34. However, it is well known that during the operation of the system 32, ice and frost collect on the evaporator 33 and, eventually, lowers the efficiency of the system 32.

Thus, the control device 30 of this invention is controlled in a manner hereinafter set forth to cause the actuator 55 to be moved downwardly from a position illustrated in FIGURE 1 to the position illustrated in FIGURE 2 at a preselected time to disconnect the contacts 49 and 50 from the contacts 51 and 53 to terminate the operation of the motor 41 and to place the contacts 49 and 50 against the contacts 56 and 57 whereby the power leads $L^1$ and $L^2$ are now connected to the heater 58 which will melt the frost and ice on the evaporator 33.

Figure 2:
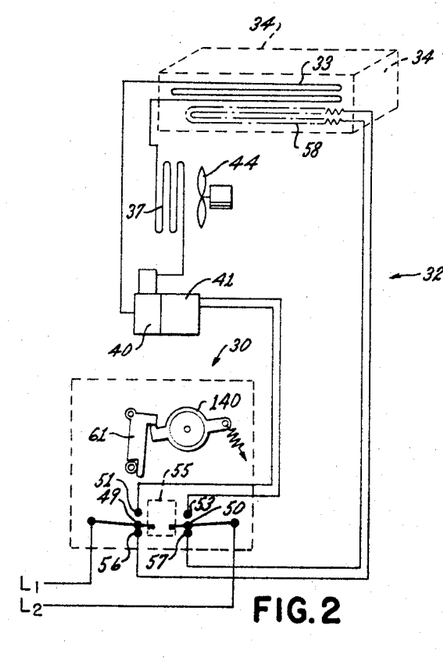
FIGURE 2 is a view similar to FIGURE 1 and illustrates a time lapse terminating means for the control device of FIGURE 1.

The actuator 55 is held in its down position as illustrated in FIGURE 2 by a latch member 61 in a manner hereinafter described until the latch member 61 is moved to its unlatching position by any suitable means.

For example, the latch member 61 of FIGURE 2 can be moved to its unlatching position after the lapse of a preselected time in a manner hereinafter set forth to return the actuator 55 back to the position illustrated in FIGURE 1 wherein the compressor 30 is again operated in the conventional manner.

Thus, it can be seen that the system 32 illustrated in FIGURES 1 and 2 is adapted to cause the defrosting of the evaporator 33 at a preselected time and to terminate the defrosting operation after the lapse of a preselected time.

However, it may be desired to utilize the timing device to terminate the defrost operation only as a safety feature so that the defrost operation would be terminated by a normally sensed condition before the timing mechanism would terminate the defrost operation.

Figure 3:
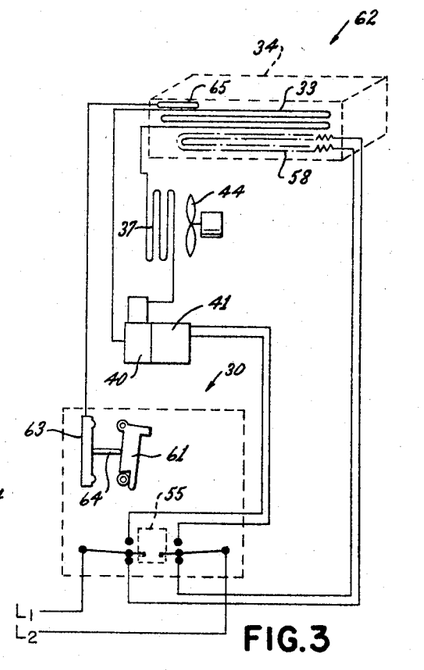
FIGURE 3 is a view similar to FIGURE 1 and illustrates a temperature terminating means for the control device of this invention.

For example, reference is made to FIGURE 3 wherein another refrigeration system is generally indicated by the reference numeral 62 and parts thereof similar to the system 32 previously described are indicated by like reference numerals.

However, the control device 30 of FIGURE 3 includes a temperature-responsive actuator 63 having a plunger 64 engageable with the latch member 61 so that when a temperature sensing bulb 65 senses a preselected temperature at the evaporator 33, the same will cause the power element 63 to expand in such a manner that the plunger 64 unlatches the latch member 61 so that the actuator 55 can be moved back to the position illustrated in FIGURE 1 to terminate the defrost cycle and to again operate the refrigeration cycle.

However, it is to be understood that should the temperature terminating means 63 fail, the control device 30 of this invention will unlatch the member 61 by the timer motor in the manner illustrated in FIGURE 2 after a preselected time as a safety feature for the system 62.

If desired, the defrosting cycle can be terminated by a pressure sensing means.

Figure 4:
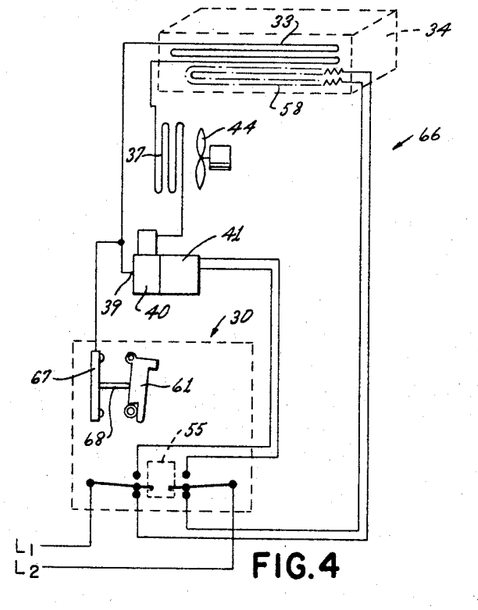
FIGURE 4 is a view similar to FIGURE 1 and illustrates a pressure terminating means for the control device of this invention.

For example, reference is made to FIGURE 4 wherein another system of this invention is generally indicated by the reference numeral 66 and parts thereof similar to the system 32 are indicated by like reference numerals.

However, a pressure responsive device 67 is provided and has a plunger 68 engageable with the latch member 61 so that when the pressure at the inlet side 39 of the compressor 40 builds up during the defrosting operation, the power element 67 expands and moves the plunger 68 to the right to unlatch the member 61 so that the actuator 55 can return the system 66 to its refrigeration cycle, it being understood that should the pressure device 67 fail during the defrosting operation, the timing mechanism of the control device 30 will unlatch the member 61 after a preselected time.

Similarly, other types of defrost terminating means may be utilized.

Figure 5:
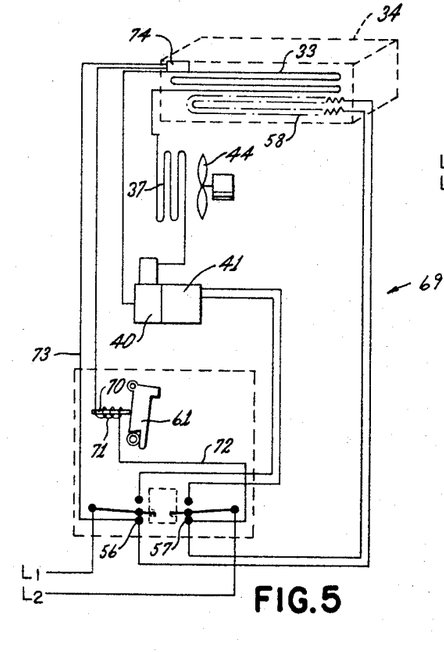
FIGURE 5 is a view similar to FIGURE 1 and illustrates a solenoid terminating means wherein the solenoid is operated from a remotely controlled means.

For example, another system of this invention is generally indicated by the reference numeral 69 in FIGURE 5 and parts thereof similar to the system 32 are indicated by like reference numerals.

As illustrated in FIGURE 5, a solenoid operated armature or plunger 70 is engageable with the latch member 61 and will move the same to its unlatching position when a solenoid coil 71 is energized, the coil 71 having one end thereof interconnected to the contact 57 by a lead 72 and the other side thereof interconnected to the contact 56 by a lead 73. The lead 73 has a switching mechanism 74 disposed therein which is adapted to close the line 73 when a suitable temperature or condition is sensed by the mechanism 74.

Thus, when the actuator 55 is moved downwardly to the position illustrated in FIGURE 5, not only is the heater element 58 interconnected to the power leads $L^1$ and $L^2$ but also the solenoid 71 is connected thereto except that current cannot flow through the coil 71 until the device 74 senses a predetermined condition. However, when the device 74 senses a predetermined condition, the same energizes the coil 71 and causes the plunger 70 to move to the right to unlatch the member 61 so that the actuator 55 can move back to the position as illustrated in FIGURE 1.

Figure 6:
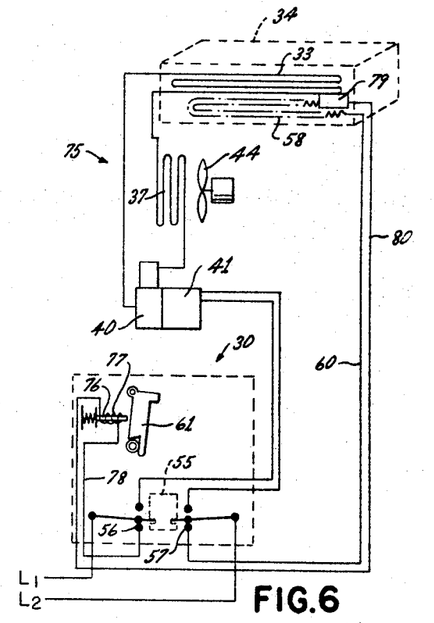
FIGURE 6 is a view similar to FIGURE 1 and illustrates another type of solenoid terminating means.

Another system of this invention is generally indicated by the reference numeral 75 in FIGURE 6 and parts thereof similar to the system 32 are indicated by like reference numerals.

A solenoid operated plunger 76 is provided and is adapted to unlatch the latch member 61 when the same receives current through a surrounding solenoid coil 77. One side of the coil 77 is interconnected to the contact 56 by a lead 78. The other side of the solenoid coil 77 is interconnected to a current sensing device 79 by a lead 80, the sensing device 79 being interconnected to one side of the heater element 58 while the other side of the heater element 58 is interconnected to the contact 57 by a lead 60 in the manner previously described.

The solenoid 77 and plunger 76 are so constructed and arranged that even though the actuator 55 is moved downwardly to the position illustrated in FIGURE 6 to permit current to flow through the heater element 58 to heat up the evaporator 33, sufficient current does not flow through the coil 77 to move the plunger 76 to its unlatching position until the current flow is at a certain level. Thereafter, the solenoid coil 77 unlatches the latch member 61 to permit the actuator 55 to return to the position illustrated in FIGURE 1.

Therefore, it can be seen that the control device 30 of this invention is adapted to be utilized in various systems wherein a switching operation is provided at a preselected time and the switching mechanism remains in its actuated position until the same is returned to its normal position by either a time control means or a condition responsive means or by either one which occurs first.

However, when the condition responsive terminating means are utilized, the time lapse terminating means can be utilized in combination therewith to provide a safety feature to unlatch the switching mechanism should the condition responsive means fail to act within a predetermined time after the switching mechanism has been actuated.

The details of the control device 30 of this invention will now be described.

Figure 7:
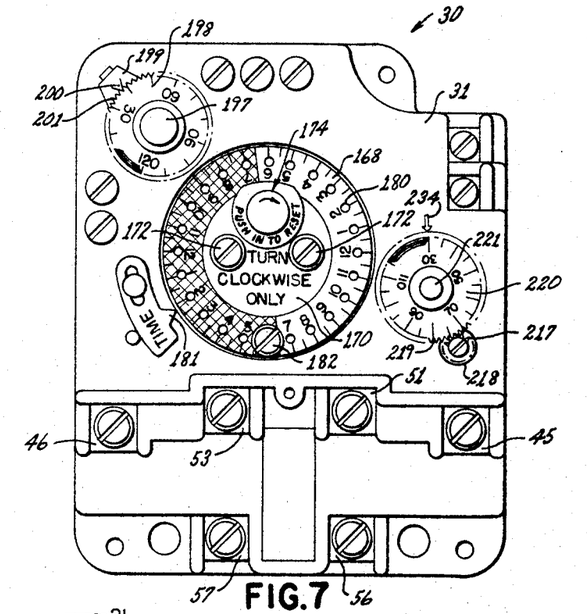
FIGURE 7 is a front view of the improved control device of this invention utilizing the terminatng means of FIGURE 4.
Figure 8:
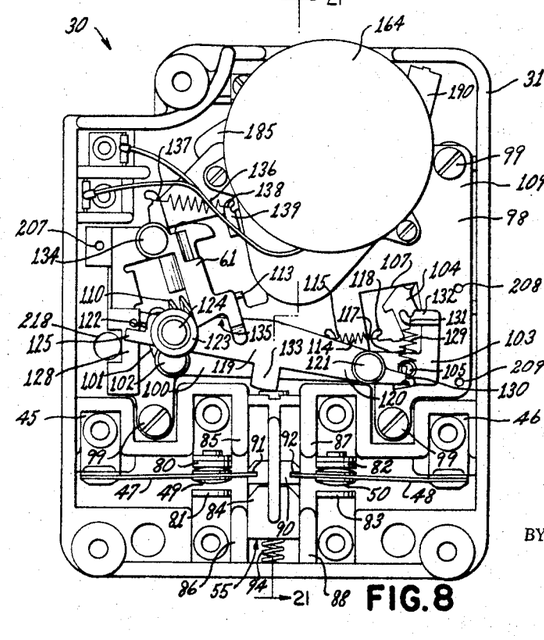
FIGURE 8 is a rear view of the control device illustrated in FIGURE 7.
Figure 9:
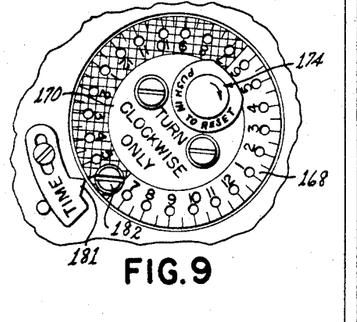
FIGURE 9 is a fragmentary front view of the control device of FIGURE 7 in one operating position thereof.

As illustrated in FIGURES 7 and 8, the control device 30 includes the housing 31 wherein the power leads $L^1$ and $L^2$ are adapted to be respectively interconnected to the terminal means 45 and 46. The terminal means 45 and 46 carry the spring blades 47 and 48 in the manner illustrated in FIGURE 8, contacts 49 and 50 thereof being adapted to respectively move between the fixed contacts 80, 81 and 82, 83 of the terminal means 51, 56 and 53, 57.

Figure 21:
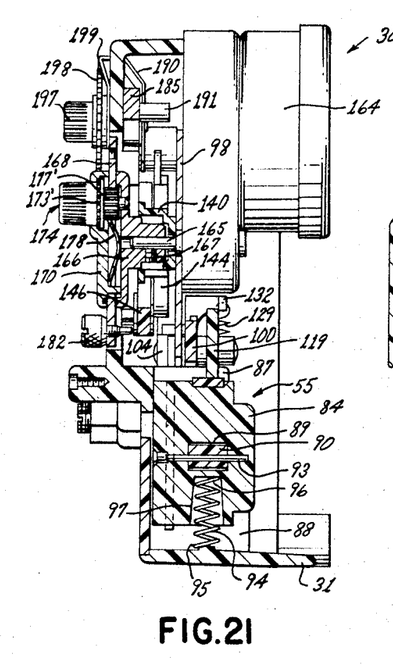
FIGURE 21 is a cross-sectional view taken on line 21—21 of FIGURE 8.

The actuator 55 previously described comprises a slide member 84, FIGURES 8 and 21, movable vertically upwardly and downwardly between housing embossments 85, 86 and 87, 88, the slide member 84 having a transverse slot 89 passing therethrough and receiving a member 90 having opposed slots 91 and 92 respectively receiving the free ends of the switch blades 47 and 48 in the manner illustrated in FIGURE 8. The member 90 is pinned to the slide member 84 by pin means 93.

The slide member 84 is urged normally upwardly by a compression spring 94 having one end 95 engaging the housing 31 and the other end 96 thereof received in a recess 97 in the bottom of the slide member 84.

Thus, the force of the compression spring 94 tends to maintain the slide member 84 normally in the position illustrated in FIGURE 8 whereby the contacts 49 and 50 are disposed in electrical contact with the contacts 80 and 82 so that the power leads $L^1$ and $L^2$ are interconnected to the terminal means 51 and 53 for the purpose previously described.

A metal plate 98 is disposed in the housing 31 and is secured thereto by fastening members 99.

Figure 19:
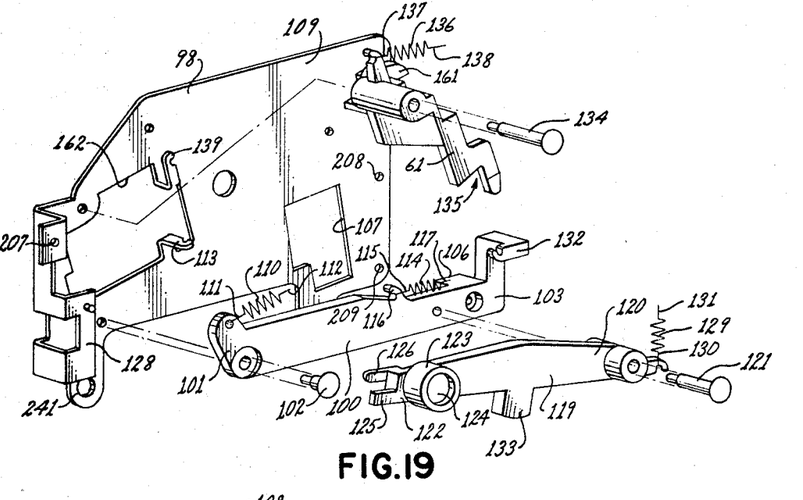
FIGURE 19 is an exploded perspective view of certain parts of the control device of FIGURE 7.
Figure 20:
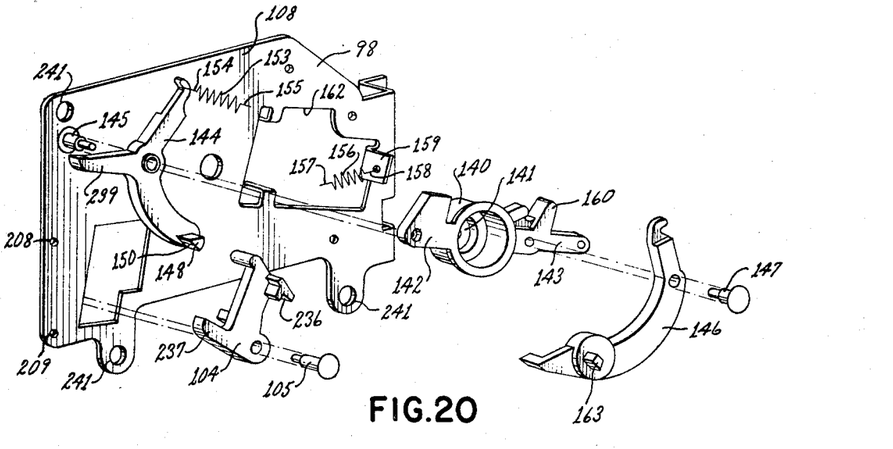
FIGURE 20 is also an exploded perspective view of other parts of the control device of FIGURE 7.

As illustrated in FIGURES 8 and 19, a first lever 100 formed of insulating material has one end 101 thereof pivotally mounted to the plate 98 by a pivot pin means 102. The other end 103 of the lever 100 is pivotally mounted to a movable member 104, FIGURE 20, by pivot pin means 105. The end 103 of the lever 100 has an extension 106 which passes through a slot 107 in the plate 98 so that the movable member 104 can be disposed on the side 108 of the plate 98 while the lever 100 is disposed on the side 109 thereof.

A tension spring 110 is provided and has one end 111 fastened to the end 101 of the lever 100 and the other end 112 fastened to a projection 113 of the plate 98. In this manner, the tension spring 110 normally tends to maintain the lever 100 in the position illustrated in FIGURE 8 whereby the end 103 has the projection 106 thereof abutting against the bottom of the slot 107 to prevent further clockwise pivotal movement of the lever 100 about the pivot pin 102.

Figures 13, 14, 15, 16:
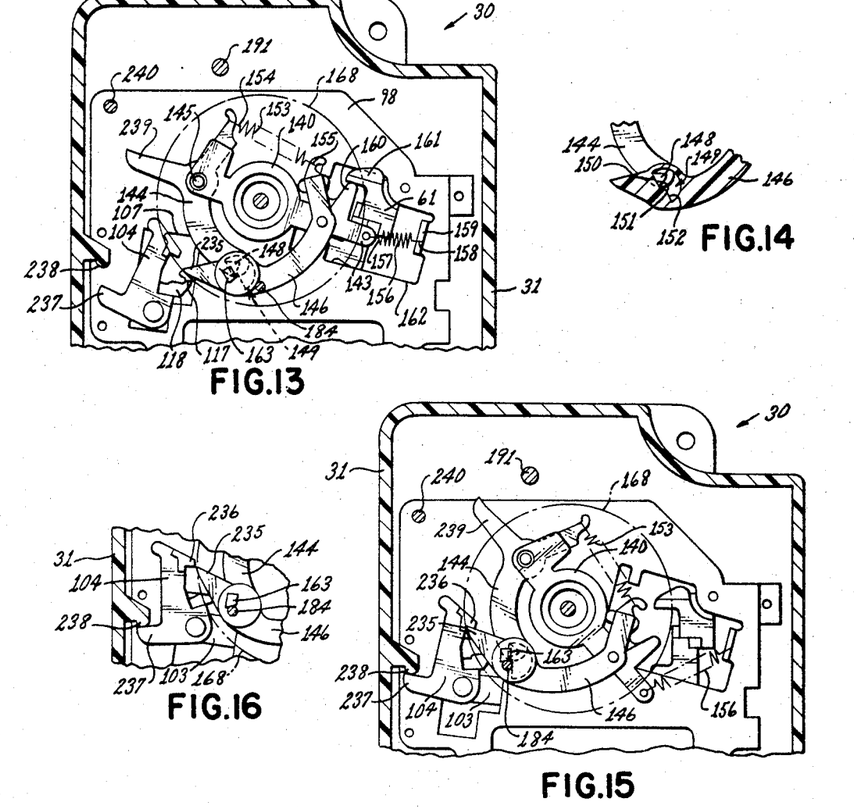
FIGURE 13 is a fragmentary, cross-sectional view illustrating certain parts of the control device of FIGURE 7.
FIGURE 14 is a fragmentary, cross-sectional view of certain of the parts illustrated in FIGURE 13.
FIGURE 15 is a view similar to FIGURE 13 and illustrates the parts in another operating position thereof.
FIGURE 16 is a fragmentary view of the parts illustrated in FIGURE 15 and illustraing another operating condition thereof.
Figure 18:
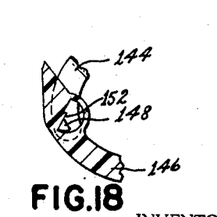
FIGURE 18 is a view similar to FIGURE 14 and illustrates the parts in another operating position thereof.

Another tension spring 114 is provided and has one end 115 interconnected to a projection 116 of the lever 100 and the other end 117 thereof interconnected to a projection 118 of the movable member 104 which projects through the slot 107 to tend to normally hold the member 104 in the pivotal position illustrated in FIGURE 13.

Another insulated lever 119 is provided and has one end 120 thereof pivotally mounted to the end 103 of the lever 100 by a pivot pin means 121. The other end 122 of the lever 119 carries a roller 123 for a purpose hereinafter described, the roller 123 being rotatably mounted to the end 122 by a pivot pin means 124. The end 122 of the lever 119 also has extending projections 125 and 126 respectively disposed on opposite sides of a flange means 128 of the plate 98 in the manner illustrated in FIGURE 8 to guide pivotal movement of the lever 119.

A tension spring 129 is provided and has one end 130 interconnected to the end 120 of the lever 119 at a point outboard of the pivot pin 121.

The other end 131 of the tension spring 129 is interconnected to a projection 132 on the end 103 of the lever 100 whereby the tension spring 129 normally tends to pivot the lever 119 in a counterclockwise direction in FIGURE 8 about pivot pin 121.

However, the force of the compression spring 94 acting on the actuator 55 is stronger than the force of the tension spring 129 whereby the actuator 55 pushes against a projection 133 of the lever 119 to hold the same normally in the pivotal position illustrated in FIGURE 8 whereby the contacts 49 and 50 are disposed in electrical contact with the fixed contacts 80 and 82.

The latch member 61 as illustrated in FIGURES 8 and 19 is pivotally mounted to the plate 98 by a pivot pin means 134, the latch member 61 having a hook portion 135 for hooking around the roller 123 on the lever 119 when the lever 119 has moved to the position illustrated in FIGURE 12 in a manner hereinafter described.

The latch member 61 is normally urged to its latching position by a tension spring 136 having one end 137 secured to the latch member 61 and the other end 138 thereof attached to a projection 139 of the plate 98.

A rotatable member 140 formed of insulating material is rotatably mounted to the side 108 of the plate 98 by pivot pin means 141, the rotatable member 140 having opposed legs 142 and 143.

A first arm 144 formed of insulating material is pivotally mounted to the leg 142 by a pivot pin means 145 and another arm 146 formed of insulating material is pivoted to the leg 143 on the side opposite to the arm 144 by a pivot pin means 147.

The arm 144 has a projection 148 receivable in a stepped recess 149 in the arm 146 in the manner illustrated in FIGURE 14, the projection 148 having a flat surface 150 normally disposed against a flat surface 151 defined by the recess 149 and outwardly stepped relative to another flat surface 152 thereof. A tension spring 153 has one end 154 interconnected to the arm 144 and the other end 155 interconnected to the arm 146 to normally hold the projection 148 against the surface 151 of the arm 146.

Another tension spring 156 is provided and has one end 157 interconnected to the leg 143 of the rotatable member 140 and the other end 158 interconnected to a projection 159 of the plate 98 whereby the tension spring 156 normally tends to move the rotatable member 140 in a counterclockwise direction in FIGURE 13 so that an abutment 160 on the leg 143 of the rotatable member 140 is engageable with a projection 161 of the latch member 61 projecting through a slot 162 in the plate 98 to move the latch member 61 in its unlatching position in a manner hereinafter described, the tension spring 156 being stronger than the tension spring 136.

The arm 146 has a projection 163 adapted to be interconnected to time moved means in a manner now to be described.

Figure 22:
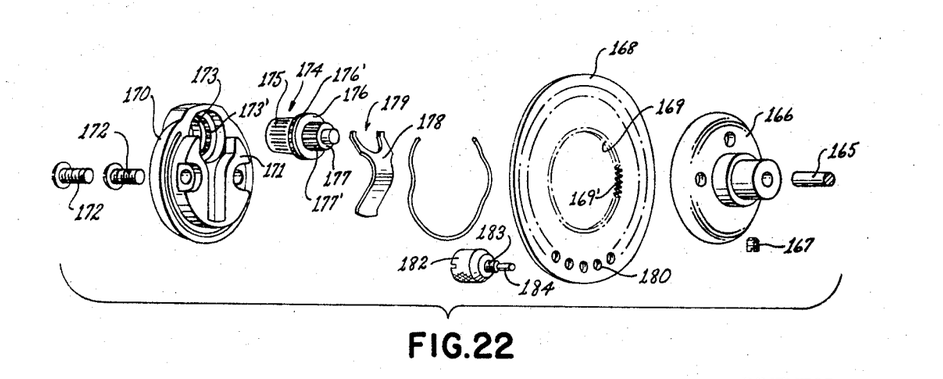
FIGURE 22 is an exploded perspective view of certain of the parts of the control device of FIGURE 7.

As illustrated in FIGURES 7, 21 and 22, a conventional timer motor 164 is carried by the housing 31 and can have the leads thereof respectively interconnected to the terminal means 45 and 46 so that the timer motor 164 will continuously run regardless of the position of the actuator 55 and as long as the power leads $L^1$ and $L^2$ are interconnected to a power source.

The timer motor 164 has an output shaft 165 secured to a housing member 166 by set screw means 167.

A disc member 168 is provided and has a bore 169 passing therethrough and defining gear teeth 169′ about the inner periphery of the bore 169.

Another housing member 170 is provided and has projections 171 adapted to pass through the bore 169 of the disc member 168 and be fastened to the housing member 166 by threaded fastening members 172 whereby the housing member 166 and 170 are adapted to be rotatable relative to the disc member 168. However, the housing member 170 has a stepped bore 173 passing therethrough and receiving an adjusting member 174, the adjusting member 174 having a knob portion 175 projecting out through the bore 173 and having an enlarged cylindrical portion 176 provided with gear teeth 176′ adapted to be disposed in meshing relation with gear teeth 173′ in the bore 173.

The adjusting member 174 also has a cylindrical portion 177 provided with gear teeth 177′ adapted to mesh with gear teeth 169′ of the disc member 168.

A leaf spring 178 is disposed between the housing members 166 and 170 and has the bifurcated end 179 thereof bearing against the cylindrical portion 176 of the adjusting member 174 to normally hold the same in the position illustrated in FIGURE 21 whereby the gear teeth 176′ of the adjusting member 174 are disposed in meshing relation with the gear teeth 173′ of the housing member 170.

Thus, with the adjusting member 174 disposed in the position illustrated in FIGURE 21, rotational movement of the output shaft 165 of the timer motor 164 rotates the housing members 166 and 170 in unison whereby the housing member carries the adjusting member 174 in an orbital path to cause like rotational movement of the disc member 168.

However, when it is desired to adjust the disc member 168 relative to the housing means 166 and 170, the operator pushes in on the adjusting member 174 to cause the gear teeth 176′ thereof to move out of meshing engagement with the gear teeth 173′ whereby when the adjusting member 174 is pushed inwardly, subsequent rotation of the adjusting member 174 by hand causes the disc member 168 to rotate to a desired position relative to the housing means 166 and 170.

Thus, as can be seen in FIGURE 7, suitable threaded holes 180 can pass through the disc member 168 and be given an hour designation so that the disc member 168 will make one complete revolution relative to a time indicating pointer 181 for every twenty-four hours of continuous operation of the timer motor 164. Thus, should it be desired to adjust the disc member 168 so that the same will indicate the actual time, the operator can utilize the adjusting member 174 to move the disc 168 relative to the housing members 166 and 170 so that the same will be in the proper time position relative to indicator 181.

A plurality of pin means 182, FIGURES 7 and 22, can be utilized and each has a threaded portion 183 adapted to be threaded into one of the bores 180 of the disc member 168 whereby a cylindrical portion 184 of the particular pin means 182 will pass through the disc 168 in the manner illustrated in FIGURE 21 to be engageable with the projection 163 on the arm 146 at the desired time in a manner hereinafter described.

Thus, should it be desired to have the control device 30 of this invention operate a defrosting operation in the manner previously described once in every twenty-four hour period with that defrosting operation taking place at, say six-o'clock in the morning, the one pin means 182 is threaded into the bore 180 indicating the six o'clock interval in the darkened area of the disc member 168 in the manner illustrated in FIGURE 7.

However, it is to be understood that if the control device 30 of this invention is to operate the switching mechanism at two or more intervals in each twenty-four period, the additional pin means 182 carried by the housing means 30 can be utilized and inserted in the appropriate apertures 180 for operating the mechanism in a manner hereinafter set forth.

As previously set forth, the control device 30 of this invention is adapted to terminate a defrost cycle after a preselected time interval has lapsed from the time the actuator 55 has been moved downwardly in the manner illustrated in FIGURE 2.

Figure 23:
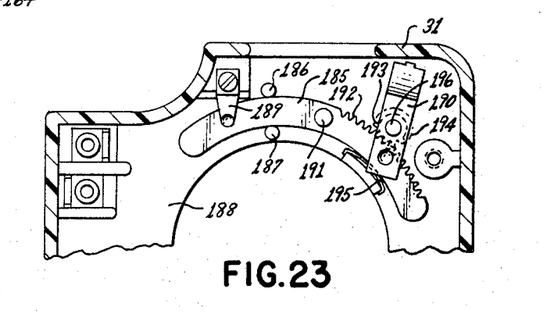
FIGURE 23 is a fragmentary cross-sectional view of part of the control device illustrated in FIGURE 7.

The means for selecting this time lapse interval is illustrated in FIGURE 23 wherein an arcuate member 185 passes between embossments 186 and 187 on the interior of the housing means 31 and is held against the inside surface 188 of the housing means 31 by leaf springs 189 and 190, the movable member 185 having an outwardly directed projection 191 for actuating the arm arrangement 144, 146 and the rotatable member 140 to move the latch member 61 to its unlatching position at a selected time interval after the actuator 55 has been moved downwardly in the manner illustrated in FIGURE 2.

In particular, the movable member 185 has peripheral gear teeth 192 urged into meshing relation with the gear teeth 193 of a pinion gear 194 by a leaf spring 195, the pinion gear 193 being rotatably mounted to the housing means 31 by a shaft 196 interconnected to a knob 197, FIGURE 7, carrying a plate member 198 normally held in its set position by a leaf type spring 199 carried by the housing 31 and having a tongue 200 receivable in gearlike teeth 201 on the outer periphery of the disc 198. The tongue 200 also serves to indicate the desired time lapse for deactuation of the actuator 55.

For example, should it be desired to adjust the time lapse period from, say thirty minutes to thirty-eight minutes, the operator presses down on the leaf spring 199 to clear the tongue 200 from the gear teeth 201 on the disc 198 so that the operator can rotate the knob 197 to position the thirty-eight intervals on the disc 199 adjacent to tongue 200 so that when the operator releases on the leaf spring 199, the tongue 200 will enter the appropriate gap between the teeth 201 to hold the disc member 198 in the position illustrated in FIGURE 7, the adjustment of the knob 197 to the position illustrated in FIGURE 7 causing adjustment of the pinion gear 194 and, thus, adjustment of the position of the abutment 191 for a purpose hereinafter described.

As previously set forth, the embodiment of the control device 30 illustrated in detail in the drawings is of the type wherein the switching operation is terminated when a predetermined pressure in the refrigerant system 32 is sensed.

Figure 24:
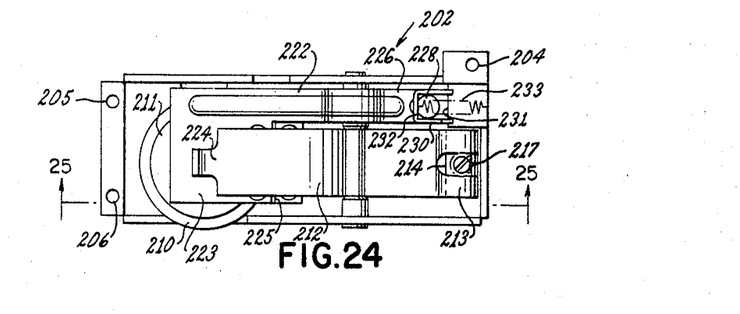
FIGURE 24 is a view of the pressure or temperature terminating means for the control device of FIGURE 7.
Figure 25:
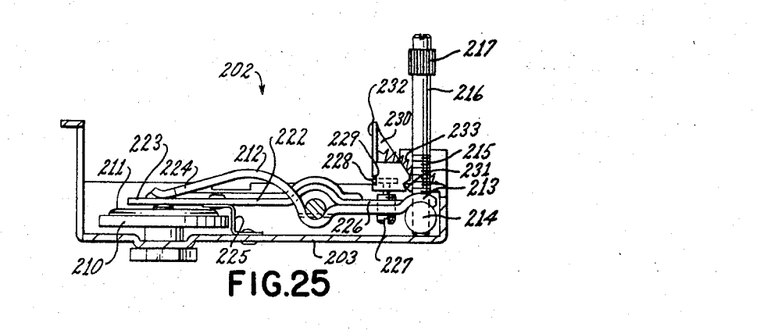
FIGURE 25 is a cross-sectional view taken on line 25—25 of FIGURE 24.
Figure 26:
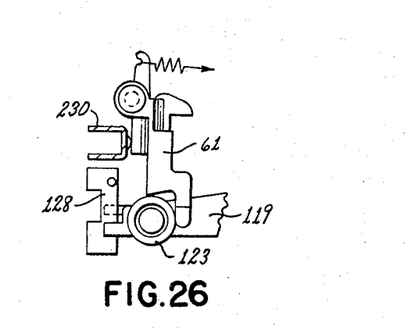
FIGURE 26 is a fragmentary, cross-sectional view illustrating how the pressure terminating device of FIGURE 24 operates the mechanism of the control device of FIGURE 7.

For example, reference is now made to FIGURES 24–26 wherein a pressure sensing means 202 is provided and comprises a frame member 203 adapted to be fastened to the housing means 31 by having threaded fastening members passing through apertures 204, 205, and 206 of the frame means 203 into threaded bores 207, 208 and 209 of the plate member 98.

The frame member 203 carries an expansible and contractable power element 210 having a movable wall 211 movable in response to the pressure at the inlet end 29 of the compressor 40 in the manner illustrated in FIGURE 4.

A pin is carried by the frame means 203 and under which a spring 212 is disposed, the spring member 212 having one end 213 disposed over a rod 214 threadedly carried on the threaded end 215 of an adjusting pin 216. Thus, the pivotal position of the end 213 relative to the pin 216 can be adjusted by threaded relation between the pin 216 and the rod 214, the pin 216 having a pinion gear 217 on the end thereof and projecting through an aperture 218 in the housing means 31 in the manner illustrated in FIGURE 7 to be disposed in meshing relation with gear teeth 219 carried on a disc 220 rotatably mounted to the housing means 31 by pivot pin means 221.

A motion transmitting member 222 is provided and has an end 223 disposed between the movable wall 211 of the power element 210 and the other end 224 of the spring 212, the motion transmitting member 222 being pivotally attached to the frame means 203 by an L-shaped leaf spring 225. The other end 226 of the motion transmitting member 222 carries a threaded adjusting member 227 having an enlarged head 228 received in a slot 229 of a member 230 fulcrumed to a knife edge 231 of the frame means 203. The member 230 has the end 232 thereof normally urged in a clockwise direction in FIGURE 25 by a tension spring 233.

The end 232 of the member 230 is adapted to engage the latch member 61 when the latch member is disposed in its latching position as illustrated in FIGURE 26.

Thus, when the power element 210 has the movable wall 211 thereof forced outwardly by an increase in pressure at the inlet end of the compressor 40, the same moves upwardly in FIGURE 25 in opposition to the force of the leaf spring 212 to pivot the motion transmitting member 222 about the leaf spring 225 so that the end 226 of the motion transmitting member 222 moves downwardly in FIGURE 25 to pivot the member 230 about the fulcrum edge 215 so that the end 232 will move to the right in FIGURE 26 and unlatch the member 61 from the roller in a manner hereinafter described to terminate the actuation of the actuator 55 and permit the same to return to the position illustrated in FIGURE 1.

The operation of the control device 30 illustrated in FIGURES 7–26 and utilized in the system 66 of FIGURE 4 will now be described.

Assuming that the operator desires to have the control device 30 initiate a defrosting cycle only once every twenty-four hours and that the defrosting operation is to take place at 6:00 a.m., the operator inserts the pin 182 in the position illustrated in FIGURE 7.

The operator then determines at what pressure during the defrosting operation the control device 30 is to terminate the defrosting cycle. The operator selects this by moving the knob 221 to position the desired p.s.i. setting adjacent a pointer 234 on the housing means 231 in the manner illustrated in FIGURE 7 whereby the abutment means 191 is properly positioned in the manner previously described.

Thereafter, the operator then selects the desired time interval that the defrosting operation is to take place by the knob 197 so that should the pressure of the system 66 not reach the set pressure of the dial 220 during the defrosting operation after a certain length of time, the control device 30 will automatically terminate the defrosting operation. For example, the operator adjusts the dial 197 in the manner previously described so that in the embodiment illustrated in FIGURE 7, the control device 30 will terminate the defrosting operation approximately 38 minutes after the defrosting operation has been initiated at 6 a.m. should the system 66 not automatically terminate the defrosting operation by having the pressure at the inlet side 39 of the compressor 40 reach the selected p.s.i. rating of 30 p.s.i. as set by the knob 221.

Thus, the parts of the control device 30 are in the position illustrated in FIGURES 8 and 13 whereby the actuator 55 is in its up position to maintain the contacts 49 and 50 in contact with the contacts 80 and 82 whereby the compressor 40 is continuously operated by the motor 41 to deliver refrigerant under compression to the condenser 37 so that the refrigerant can expand in the evaporator 33 and cool the chamber 34.

However, as the timer motor 164 continues to rotate the disc 168 by means of the member 174 coupling the housing means 170 to disc 168, the end 184 of the pin 182 eventually makes contact with the abutment 163 on the arm 146 and causes the arms 146 and 144 and the rotatable member 140 to rotate in a clockwise direction in the manner illustrated in FIGURE 15 whereby the end 235 of the arm 146 engages under a lip 236 of the movable member 104 and carriers the same upwardly therewith until an extension 237 on the movable member 104 engages a projection 238 on the housing means 31 in the manner illustrated in FIGURES 15 and 16. As the movable member 104 is being moved upwardly by the driven arm 146, the ends 103 and 120 of the levers 100 and 119 are moved upwardly therewith whereby the lever 100 pivots about the pivot pin 102 and the lever 119 pivots about the extension 133 thereof so that the end 122 of the lever 119 pivots downwardly to the position illustrated in FIGURE 10 whereby the tension spring 136 moves the latching member 61 in a clockwise direction to have the hook-shaped portion 135 thereof latch over the roller 123 in the manner illustrated in FIGURE 10.

As the movable member 104 engages the projection 238 on the housing means 31 in the manner illustrated in FIGURES 15 and 16, it can be seen that as further clockwise movement of the arms 146 and 144 and the rotatable member 140 continues, the end 235 of the arm 146 cams the movable member 104 to rotate in a counterclockwise direction as illustrated in FIGURE 16 to celar the end 235 with the lip 236.

Figure 10:
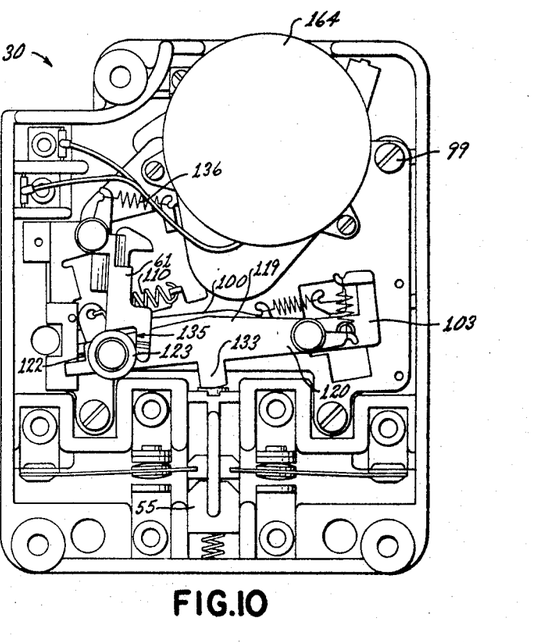
FIGURE 10 is a rear view of the control device of FIGURE 7 in the operating position of FIGURE 9.
Figure 12:
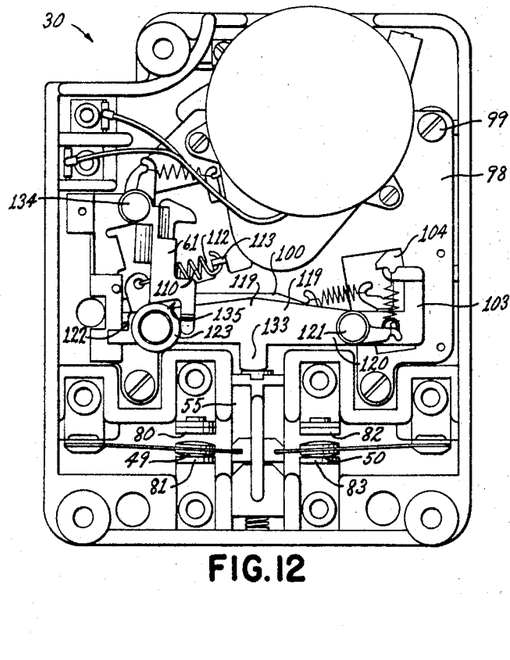
FIGURE 12 is a rear view of the control device of FIGURE 7 showing the parts thereof in the position provided by the condition illustrated in FIGURE 11.

During this upward movement of the movable member 104, it can be seen that the tension spring 110 stores up energy as the end 103 of the lever 100 is moved upwardly in the manner illustrated in FIGURE 10 whereby when the member 104 is released from the end 235 of the lever 146 in the manner illustrated in FIGURE 16, the stored up energy in the tension spring 110 snaps the end 103 of the lever 100 downwardly in a clockwise direction in the manner illustrated in FIGURE 12 whereby the pivot pin 121 carries the end 120 of the lever 119 downwardly therewith so that the lever 119 pivots about the latched roller 123 on the end 122 thereof. In this manner, the extension 133 of the lever 119 will snap the actuator 55 downwardly to the position illustrated in FIGURE 12 to cause the contacts 49 and 50 to rapidly move away from the contacts 80 and 82 and be placed into electrical contact with the contacts 81 and 83.

Figure 11:
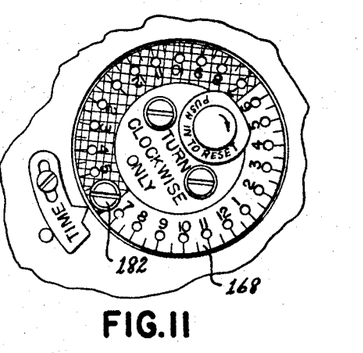
FIGURE 11 is a view similar to FIGURE 9 and illustrates another operating position of the control device of this invention.

This actuation of the actuator 55 takes place with a snap action exactly at 6 a.m. as set by the pin 182 in the disc 168 in the manner illustrated in FIGURE 11 so that the operation of the compressor 40 is terminated and the heater 58 is energized to defrost the frost and ice on the evaporator 33.

This defrosting operation takes place in the manner illustrated in FIGURE 2 until the pressure on the inlet side 39 of the compressor 40 builds up to the pressure set by the knob 221 wherein the movable wall 211 of the power element 210 has moved outwardly to such a degree that the same causes the end 232 of the member 230 to move the latch member 61 in a counterclockwise direction to free the end 122 of the lever 119. With the latch member 61 moved in a counterclockwise direction as illustrated in FIGURE 8, it can be seen that the force of the compression spring 94 overcomes the force of the tension spring 129 and rapidly moves the actuator 55 upwardly to move the contacts 49 and 50 out of contact with the contacts 81 and 83 and back into contact with the contacts 80 and 82 whereby the lever 119 assumes the position illustrated in FIGURE 8.

With the control device 30 now in the position illustrated in FIGURE 8, it can be seen that the current flow to the heater 58 is terminated and the electrical motor 41 is again energized to drive the compressor 40 to run the system 66 in the refrigeration cycle thereof, the system 66 being disposed in the position illustrated in FIGURE 1 until another 24 hours elapses whereby the pin 182 again initiates the defrosting cycle in the manner previously described.

As previously set forth, the control device 30 of this invention is adapted to terminate the defrosting cycle after a predetermined lapse of time has taken place after the defrost cycle has been initiated should the defrosting cycle not be terminated by the pressure sensing means previously described.

Therefore, assuming that a malfunction has occurred in the pressure sensing means previously described, continuous movement of the disc 168 in the manner illustrated in FIGURE 16 causes the arms 146 and 144 and rotatable member 140 to continue to rotate in a clockwise direction in opposition to the force of the tension spring 156, the tension spring 153 holding the arms 146 and 144 in the interconnected relation as illustrated in FIGURE 14.

However, when the predetermined lapse of time has run past the time that the defrost cycle was initiated, an extension 239 on the arm 144 makes contact with the abutment 191 of the member 185 in the manner illustrated in FIGURE 17 whereby the arm 144 pivots on the pin 145 thereof to cause the projection 148 to be cammed inwardly by the moving arm 146 to that the moving arm 146 can also pivot on its pivot pin 147 to the position illustrated in FIGURE 17. In this manner, the projection 148 now moves against the surface 152 of the arm 146 in the manner illustrated in FIGURE 18. This change of the position of the interconnection between the arms 146 and 144 brings the abutment 163 on the arm 146 inwardly so that the pin 182 clears the same in the manner illustrated in FIGURE 17.

As the abutment 163 on the arm 146 slips by the moving pin 182 in the manner illustrated in FIGURE 17, the stored energy in the tension spring 156 causes counterclockwise rotation of the rotatable member 140 and the arms 146 and 144 pivoted thereto back to the position illustrated in FIGURE 13 whereby the abutment 160 on the rotatable member 140 snaps against the projection 161 of the latch member 61 to pivot the latch member 61 in a counterclockwise direction in the manner illustrated in FIGURE 8 to unlatch the end 122 of the arm 119 so that the actuator 55 can return to the position illustrated in FIGURE 8 in the same manner as when the latch member 61 was unlatched by the pressure sensing means in a manner previously described.

As the rotatable member 140 is rotated back to the position illustrated in FIGURE 13 by the tension spring 156, the tension spring 153 again adjusts the positions of the arms 146 and 144 to hold the same back into the interconnected relationship illustrated in FIGURE 14 so that the abutment 163 will again be in position to be engaged by a pin 182 advancing in the manner illustrated in FIGURES 13 and 15.

While the above operation for the resetting of the arms 144 and 146 and rotatable member 104 has been described in connection with the safety unlatching of the latch member 61, it is to be understood that the arms 144 and 146 and rotatable member 104 are reset in the same manner even though the latch member 61 has been unlatched by the pressure sensing means previously described.

While the control device 30 of this invention has been previously described as initiating a defrosting or switching cycle once in every twenty-four hour period, it is to be understood that the control device 30 can initiate and terminate the switching operation any desired number of times in any twenty-four hour period by merely utilizing additional pins 182 in the manner previously described.

Further, while the control device 30 has been previously described as terminating the switching or defrosting cycle by means of the pressure means illustrated in FIGURE 4, it is to be understood that the switching operation can be terminated by other means in the manner previously described, the device 202 also being useable as a temperature sensing means, if desired.

Therefore, it can be seen that this invention provides an improved control device which will initiate a switching operation at a preselected time and will terminate that switching operation automatically upon a sensed condition. Further, the control device of this invention has a safety feature of terminating the switching operation after a lapsed time if the selected sensed condition should not occur or a malfunction occur in the device of this invention.

However, it is to be understood that the control device 30 of this invention can be utilized without a condition sensing means for terminating the switching operation whereby the control device 30 of this invention will initiate the switching operation at a preselected time and will terminate that switching operation after a predetermined lapse of time.

By utilizing a three point mounting of the base plate 98 to the housing means 31 by means of fastening members 99 passing through apertures 241 in the plate 98 and on the frame means 203, distortion effects have been greatly reduced.

Further, no functional parts are assembled in the control device 30 where the manufacturer does not have relatively full control of the situation.

For example, the temperature or presure components 202 are not mounted to a component of the control device 30 whereby the control mounting 202 causes a distortion which changes the control setting.

It is believed that a control especially for defrost application is not known to be available with the electrical rating the control 30 of this invention is designed to accommodate.

Versatility in the switching arrangement of the control device 30 of this invention as illustrated in FIGURES 1-6 is accomplished by starting with a more complex action. Then by leaving out parts not required, the control 30 can be made versatile as previously stated.

The control 30 of this invention is adapted to incorporate control variations in a relatively simple and effective manner. This is accomplished by having a common terminating means whereby variations may become functional. Other variations are possible such as removing the time feature, having fixed time terminating means instead of adjustable means, have a calibrating dial to indicate pressure or temperature, combination of various functional models to obtain a more complex action, the speed variation available for time, etc.

Since the control device 30 of this invention does not have a gear train as in prior known controls, the control device 30 of this invention is not subject to dirt and dust problems normally concerned with prior known controls.

It is believed that known competitive controls have as much as twenty-five percent to fifty percent more volume than the control 30 of this invention when packaged in an appropriate case.

The control 30 of this invention provides ready accessibility to all adjustments, wiring and mounting means on the front of the control 30 as is desired by service personnel.

Further, the control 30 of this invention is relatively easy to assemble as the various subassemblies can be preassembled and then assembled into the common housing 31.

Therefore, it can be seen that this invention not only provides an improved control device having one or more of the novel features set forth above but also this invention provides parts for such a control device or the like.

While the form of the invention now preferred has been disclosed as required by the statutes, other forms may be used, all coming within the scope of the claims which follow.

What is claimed is:

1. In combination, a housing carrying a movable actuator having means normally maintaining said actuator in one position thereof, a movable member carried by said housing, spring means carried by said housing and normally maintaining said member in one position, a lever having one end pivoted to said member and being operatively interconnected to said actuator, means for moving said member to another position thereof in opposition to said spring means to pivot the other end of said lever to one position thereof, means for latching against said other end of said lever in said one position thereof, and means for rapidly releasing said member from said other position thereof to cause said lever to pivot about said latched other end thereof with a snap action to move said actuator to another position thereof.

2. A combination as set forth in claim 1 and including means to unlatch said other end of said lever to cause said first-named means to move said actuator to said one position thereof.

3. In combination, a housing carrying electrical switching means, a movable actuator for operating said switching means, means normally maintaining said actuator in one position thereof, a movable member carried by said housing, spring means carried by said housing and normally maintaining said member in one position, a lever having one end pivoted to said member and being operatively interconnected to said actuator, means for moving said member to another position thereof in opposition to said spring means to pivot the other end of said lever to one position thereof, means for latching against said other end of said lever in said one position thereof, and means for rapidly releasing said member from said other position thereof to cause said lever to pivot about said latched other end thereof with a snap action to move said actuator to another position thereof to operate said switch means.

4. A combination as set forth in claim 3 and including means to unlatch said other end of said lever to cause said first-named means to move said actuator to said one position thereof.

5. In combination, a housing carrying a movable actuator having means normally maintaining said actuator in one position thereof, a movable means carried by said housing, spring means carried by said housing and normally maintaining said movable means in one position, a lever having one end pivoted to said movable means and being operatively interconnected to said actuator, a drive means for moving said movable means to another position thereof in opposition to said spring means to pivot the other end of said lever to one position thereof, a latching member for latching against said other end of said lever in said one position thereof, and means for disconnecting said drive means from said movable means to cause said lever to pivot about said latched other end thereof with a snap action to move said actuator to another position thereof.

6. A combination as set forth in claim 5 and including spring means normally maintaining said latching member in its latching position.

7. A combination as set forth in claim 5 wherein said drive means is adapted to move said latching member to an unlatching position thereof after being disconnected from said movable means so that said first-named means can move said actuator back to said one position thereof.

8. A combination as set forth in claim 7 wherein means are provided to select the time when said drive means moves said latching member to its unlatching position.

9. A combination as set forth in claim 5 and including condition responsive means to move said latching member to an unlatching position thereof after sensing a predetermined condition after said drive means has been disconnected from said movable member so that said first-named means can move said actuator back to said one position thereof.

10. A combination as set forth in claim 9 wherein means are provided to select said predetermined condition.

11. A combination as set forth in claim 5 wherein said drive means includes a rotatable member normally urged to one position thereof, said rotatable member when returned to said one position thereof unlatching said latching member.

12. In combination, a housing carrying a movable actuator having means normally maintaining said actuator in one position thereof, a movable means carried by said housing, spring means carried by said housing and normally maintaining said movable means in one position, a lever having one end pivoted to said movable means and being operatively interconnected to said actuator, a drive means for moving said movable means to another position thereof in opposition to said spring means to force the other end of said lever to one position thereof, a latching member for latching said other end of said lever in said one position thereof, and means for disconnecting said drive means from said movable means to cause said lever to pivot about said latched other end thereof with a snap action to move said actuator to another position thereof, said drive means including a rotatable member normally urged to one position thereof, said rotatable member when returned to said one position thereof unlatching said latching member, said drive means including a pair of arms pivotally mounted to said rotatable member and interconnected together.

13. A combination as set forth in claim 12 wherein said arms are connected together by a slot and pin arrangement.

14. In combination, a housing carrying electrical switching means, a movable actuator for operating said switching means, means normally maintaining said actuator in one position thereof, a first lever having one end thereof pivotally mounted to said housing, spring means carried by said housing and normally maintaining the other end of said first lever in one position thereof, a second lever pivotally mounted at one end thereof to said other end of said first lever and operatively interconnected to said actuator, means for pivoting said other end of said first lever in one direction to another position thereof in opposition to said spring means to pivot the other end of said second lever to one position thereof, means for latching against said other end of said second lever in said one position thereof, and means for rapidly releasing said other end of said first lever to cause said first lever to pivot said second lever about said latched other end thereof with a snap action to move said actuator to another position thereof to operate said switch means.

15. A combination as set forth in claim 14 and including means to unlatch said other end of said second lever to cause said first-named means to move said actuator to said one position thereof.

16. In combination, a housing carrying electrical switching means, a movable actuator for operating said switching means, means normally maintaining said actuator in one position thereof, a first lever having one end thereof pivotally mounted to said housing, spring means carried by said housing and normally maintaining the other end of said first lever in one position thereof, a second lever pivotally mounted at one end thereof to said other end of said first lever and operatively interconnected to said actuator, means for pivoting said other end of said first lever in said one direction to another position thereof in opposition to said spring means to pivot the other end of said second lever to one position thereof, means for latching said other end of said second lever in said one position thereof, and means for rapidly releasing said other end of said first lever to cause said first lever to pivot said second lever about said latched other end thereof with a snap action to move said actuator to another position thereof to operate said switch means, said second lever having an intermediate portion engaging said actuator.

17. A combination as set forth in claim 14 wherein said spring means is a tension spring.

18. A combination as set forth in claim 14 and including spring means normally moving said latching means to its latching position.

19. A combination as set forth in claim 14 and including spring means normally maintaining said other end of said second lever in another position thereof.

20. A combination as set forth in claim 14 wherein said switch means includes opposed fixed contact means and interposed movable contact means carried by said actuator.

21. A combination as set forth in claim 20 wherein said actuator places said movable contact means in contact with one of said opposed fixed contact means when said actuator is in said one position thereof and places said movable contact means in contact with the other of said opposed fixed contact means when said actuator is in said other position thereof.

22. In combination, a housing carrying electrical switching means, a movable actuator for operating said switching means, means normally maintaining said actuator in one position thereof, a first lever having one end thereof pivotally mounted to said housing, spring means carried by said housing and normally maintaining the other end of said first lever in one position thereof, a second lever pivotally mounted at one end thereof to said other end of said first lever and being operatively interconnected to said actuator, a movable member for pivoting said other end of said first lever in one direction to another position thereof in opposition to said spring means to pivot the other end of said second lever to one position thereof, a timer motor, a drive means driven by said motor for moving said member at a preselected time, a latch member for latching said other end of said second lever in said one position thereof, and means for disconnecting said drive means from said movable member to cause said first lever to pivot said second lever about said latched other end thereof with a snap action to move said actuator to another position thereof to operate said switch means.

23. A combination as set forth in claim 22 and including spring means normally moving said latch member to its latching position.

24. A combination as set forth in claim 22 wherein said drive means is adapted to move said latch member to an unlatching position thereof after a predetermined time from said preselected time so that said first-named means can move said actuator back to said one position thereof.

25. A combination as set forth in claim 24 wherein means are provided to select said predetermined time.

26. A combination as set forth in claim 22 and including condition responsive means for moving said latch member to an unlatching position thereof after sensing a predetermined condition after said preselected time so that said first-named means can move said actuator back to said one position thereof.

27. A combination as set forth in claim 26 wherein means are provided to select said predetermined condition.

28. A combination as set forth in claim 22 wherein said drive means includes a rotatable member normally urged to one position thereof, said rotatable member when returned to said one position thereof unlatching said latch member.

29. A combination as set forth in claim 28 wherein said drive means includes a pair of arms pivotally mounted to said rotatable member and interconnected together.

30. A combination as set forth in claim 29 wherein said arms are connected together by a slot ad pin arrangement.

References Cited
UNITED STATES PATENTS

| | | | |
|---|---|---|---|
| 2,447,137 | 8/1948 | Runke | 200—67 X |
| 2,492,762 | 12/1949 | Palme | 200—153.7 X |
| 2,623,967 | 12/1952 | Herman et al. | 200—67 X |

ROBERT K. SCHAEFER, *Primary Examiner.*

HERMAN O. JONES, *Assistant Examiner.*